(12) United States Patent
Suhara et al.

(10) Patent No.: US 7,824,803 B2
(45) Date of Patent: *Nov. 2, 2010

(54) POSITIVE ELECTRODE ACTIVE SUBSTANCE FOR LITHIUM SECONDARY BATTERY AND PROCESS FOR PRODUCING THE SAME

(75) Inventors: Manabu Suhara, Kanagawa (JP); Naoshi Saito, Kanagawa (JP); Kazushige Horichi, Kanagawa (JP); Megumi Uchida, Kanagawa (JP)

(73) Assignee: Seimi Chemical Co., Ltd., Chigasaki-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/175,652

(22) Filed: Jul. 18, 2008

(65) Prior Publication Data

US 2009/0017383 A1 Jan. 15, 2009

Related U.S. Application Data

(62) Division of application No. 10/529,289, filed as application No. PCT/JP03/012259 on Sep. 25, 2003, now abandoned.

(30) Foreign Application Priority Data

Sep. 26, 2002 (JP) .............................. 2002-281862
Sep. 26, 2002 (JP) .............................. 2002-281875

(51) Int. Cl.
*H01M 4/58* (2010.01)
*H01M 4/00* (2010.01)
*H01M 4/88* (2010.01)
*C01D 1/02* (2006.01)

(52) U.S. Cl. .............................. 429/231.3; 429/231.95; 429/128; 252/182.1; 423/594.6

(58) Field of Classification Search ................ 428/128; 429/128, 129, 231.3, 231.95; 423/594.6; 252/182.1

See application file for complete search history.

(56) References Cited

U.S. PATENT DOCUMENTS 5,955,051 A * 9/1999 Li et al. ................... 423/594.4

| | | | |
|---|---|---|---|
| 6,103,213 A | 8/2000 | Nakamura et al. | |
| 6,617,073 B1 | 9/2003 | Matsumoto et al. | |
| 6,929,883 B2 | 8/2005 | Suhara et al. | |
| 7,018,741 B2 | 3/2006 | Suhara et al. | |
| 7,192,672 B2 | 3/2007 | Horichi et al. | |
| 7,270,797 B2 | 9/2007 | Suhara et al. | |
| 7,306,779 B2 | 12/2007 | Suhara et al. | |
| 7,368,095 B2 | 5/2008 | Munakata et al. | |
| 7,381,498 B2 | 6/2008 | Suhara et al. | |
| 2001/0010807 A1 | 8/2001 | Matsubara | |
| 2004/0213729 A1 | 10/2004 | Suhara et al. | |
| 2005/0220700 A1 | 10/2005 | Suhara et al. | |
| 2006/0154146 A1 | 7/2006 | Kawasato et al. | |
| 2006/0210879 A1 | 9/2006 | Kawasato et al. | |
| 2007/0026314 A1 | 2/2007 | Kawasato et al. | |
| 2007/0099087 A1 | 5/2007 | Mihara et al. | |
| 2007/0111097 A1 | 5/2007 | Suhara et al. | |
| 2007/0117014 A1 | 5/2007 | Saito et al. | |
| 2007/0298324 A1 | 12/2007 | Kawasato et al. | |

FOREIGN PATENT DOCUMENTS

| | | |
|---|---|---|
| JP | 9-306546 | 11/1997 |
| JP | 11-86845 | 3/1999 |
| JP | 2000-82466 | 3/2000 |
| JP | 2002-93417 | 3/2002 |
| JP | 2003-217582 | 7/2003 |
| JP | 2003-257416 | 9/2003 |
| WO | WO99/49528 | 9/1999 |

OTHER PUBLICATIONS

IPDL JPO Machine Translation for JP 2003-257416.
Machine Translation of JP-2002093417 (previously made of record by Applicant via IDS).
U.S. Appl. No. 10/089,109, filed Mar. 26, 2002, Suhara, et al.

* cited by examiner

*Primary Examiner*—Gregg Cantelmo
*Assistant Examiner*—Eugenia Wang
(74) *Attorney, Agent, or Firm*—Oblon, Spivak, McClelland, Maier & Neustadt, L.L.P.

(57) ABSTRACT

A positive electrode active material is produced by firing, as a cobalt source, a mixture of a) substantially spherical large particle size cobalt hydroxide or tricobalt tetraoxide having a sharp particle size distribution, and b) small particle size cobalt hydroxide or tricobalt tetraoxide, in a proportion of from 9:1 to 1:2 as the cobalt atomic ratio, at a temperature of from 700° C. to 1050° C. in an oxygen-comprising atmosphere.

4 Claims, No Drawings

POSITIVE ELECTRODE ACTIVE SUBSTANCE FOR LITHIUM SECONDARY BATTERY AND PROCESS FOR PRODUCING THE SAME

TECHNICAL FIELD

The present invention relates to a positive electrode active material for a lithium secondary battery, which has a large volume capacity density and high safety and is excellent in the charge and discharge cyclic durability, a positive electrode for a lithium secondary battery employing it, and a lithium secondary battery.

BACKGROUND ART

Recently, as the portability and cordless tendency of instruments have progressed, a demand for a non-aqueous electrolyte secondary battery such as a lithium secondary battery which is small in size and light in weight and has a high energy density, has been increasingly high. As a positive electrode active material for the non-aqueous electrolyte secondary battery, a composite oxide of lithium and a transition metal such as $LiCoO_2$, $LiNiO_2$, $LiNi_{0.8}CO_{0.2}O_2$, $LiMn_2O_4$ or $LiMnO_2$, has been known.

Among them, a lithium secondary battery using a lithium-cobalt composite oxide ($LiCoO_2$) as a positive electrode active material and using a lithium alloy or carbon such as graphite or carbon fiber as a negative electrode, can obtain a high voltage at a level of 4V, whereby it has been widely used as a battery having a high energy density.

However, in a case of the non-aqueous type secondary battery using $LiCoO_2$ as a positive electrode active material, further improvement of the capacity density per unit volume of a positive electrode layer and the safety, has been desired. On the other hand, there has been a problem of deterioration of the cyclic properties such as gradual reduction of the battery discharge capacity due to repetitive charge and discharge cycle, a problem of the weight capacity density or substantial reduction of the discharge capacity at a low temperature.

In order to solve a part of these problems, it has been proposed in JP-A-6-243897 that the average particle size of $LiCoO_2$ as a positive electrode active material, be from 3 to 9 μm, the volume occupied by a group of particles having a particle size of from 3 to 15 μm, be at least 75% of the total volume, and the intensity ratio of the diffraction peaks at 2θ=about 19° and 45° as measured by means of X-ray diffraction using CuKα as a radiation source, be of a specific value, so that it becomes an active material excellent in the coating properties, the self-discharge properties and the cyclic properties. Further, in the document, it has been proposed that the positive electrode active material is preferably one which does not substantially have such a particle size distribution that the particle size of $LiCoO_2$ is 1 μm or smaller or 25 μm or larger. With such a positive electrode active material, the coating properties and the cyclic properties have been improved, but, the safety, the volume capacity density and the weight capacity density, have not yet been fully satisfactory.

Further, in order to improve the weight capacity density and the charge and discharge cyclic properties of the positive electrode, JP-A-2000-82466 proposes a positive electrode active material wherein the average particle size of lithium-cobalt composite oxide particles is from 0.1 to 50 μm, and at least two peaks are present in the particle size distribution. Further, it has been proposed to mix two types of positive electrode active materials having different average particle sizes to prepare a positive electrode active material wherein at least two peaks are present in the particle size distribution. In such a proposal, there may be a case where the weight capacity density and the charge and discharge cyclic properties of the positive electrode can be improved, but on the other hand, there is a complication that the positive electrode material powders having two types of particle size distributions have to be produced, and one satisfying all of the volume capacity density, the safety, the coating uniformity, the weight capacity density and the cyclic properties of the positive electrode, has not yet been obtained.

Further, in order to solve the problem related to the battery characteristics, JP-A-3-201368 proposes to replace 5 to 35% of Co atoms with W, Mn, Ta, Ti or Nb to improve the cyclic properties. Further, JP-A-10-312805 proposes to use hexagonal $LiCoO_2$ as a positive electrode active material to improve the cyclic properties, wherein the c axis length of the lattice constant is at most 14.051 Å, and the crystal lattice size of (110) direction of the crystal lattice is from 45 to 100 nm.

Further, JP-A-10-72219 proposes that a lithium-cobalt composite oxide of the formula $Li_xNi_{1-y}N_yO_2$ (wherein $0<x<1.1$, $0 \leq y \leq 1$), of which the primary particles are plate-like or columnar, the ratio of (volume basis cumulative 95% size–volume basis cumulative 5% size)/(volume basis cumulative 5% size) is at most 3, and further, the average particle size is from 1 to 50 μm, has a high initial discharge capacity per weight and further is excellent in the charge and discharge cyclic durability.

However, in the prior art, there has been no lithium secondary battery using a lithium-cobalt composite oxide as a positive electrode active material, which sufficiently satisfies all of the volume capacity density, the safety, the coating uniformity, the cyclic properties and further the low temperature properties.

DISCLOSURE OF THE INVENTION

It is an object of the present invention to provide a positive electrode active material for a lithium secondary battery, which has a large volume capacity density and high safety and is excellent in the charge and discharge cyclic durability, a positive electrode for a lithium secondary battery employing it, and a lithium secondary battery.

The present inventors have continued extensive studies to achieve the above object and as a result, have found that a positive electrode active material containing a lithium-cobalt composite oxide having a specific composition and comprising a mixture containing first particles of lithium-cobalt composite oxide being hard and substantially spherical and having such a sharp particle size distribution that the volume basis cumulative size D10 is at least 50% of the average particle size D50 and the volume basis cumulative size D90 is at most 150% of the average particle size D50, and second particles of lithium-cobalt composite oxide filling the space among the first particles, in a specific proportion of the first particles and the second particles, has a compacted dense structure and thereby has large volume capacity density and press density, and the above object can be achieved by the positive electrode active material.

Namely, the present invention is essentially directed to the following.

(1) A positive electrode active material for a lithium secondary battery, which comprises a lithium-cobalt composite oxide represented by the formula $Li_pCo_xM_yO_zF_a$ (wherein M is a transition metal element other than Co or an alkaline earth metal element, $0.9 \leq p \leq 1.1$, $0.980 \leq x \leq 1.000$, $0 \leq y \leq 0.02$, $1.9 \leq z \leq 2.1$, $x+y=1$ and $0 \leq a \leq 0.02$) and comprising a mixture containing substantially spherical first particles of lithium-cobalt composite oxide having such a sharp particle size distribution that the volume basis cumulative size D10 is at least 50% of the average particle size D50, and the volume basis cumulative size D90 is at most 150% of the average particle size D50, and second particles of lithium-cobalt composite oxide filling the space among the above lithium-cobalt composite oxide particles, in a mass ratio of first particles/first particles of from 1/2 to 9/1.

(2) The positive electrode active material according to the above (1), wherein in the formula, M is at least one member selected from the group consisting of Ti, Zr, Hf, V, Nb, Ta, Mn, Mg, Ca, Sr, Ba and Al.

(3) The positive electrode active material according to the above (1) or (2), wherein the average particle size D50 is from 5 to 15 μm, the specific surface area is from 0.3 to 0.7 m²/g, the half value width of the diffraction peak on (110) plane at 2θ=66.5±1° is from 0.07 to 0.14° as measured by X-ray diffraction using CuKα as a radiation source, and the press density is from 3.1 to 3.4 g/cm³.

(4) The positive electrode active material according to any one of the above (1) to (3), wherein the first particles are large particles having an average particle size D50 of from 7 to 20 μm, and the second particles are small particles having an average particle size of from 10 to 30% of D50 of the first particles.

(5) The positive electrode active material according to any one of the above (1) to (4), wherein the large particles have a press density of from 2.9 to 3.2 g/cm³, and the small particles have a press density of from 2.7 to 3.1 g/cm³.

(6) A process for producing the positive electrode active material for a lithium secondary battery as defined in any one of the above (1) to (3), which comprises firing, as a cobalt source, a mixture of substantially spherical large particle size cobalt hydroxide or tricobalt tetraoxide having such a sharp particle size distribution that the average particle size D50 is from 7 to 20 μm, the average particle size D10 is at least 50% of the average particle size D50, and the average particle size D90 is at most 150% of the average particle size D50, and small particle size cobalt hydroxide or tricobalt tetraoxide having an average particle size D50 of from 10 to 30% of the average particle size D50 of the large particles, in a proportion of from 9:1 to 1:2 as the cobalt atomic ratio, at a temperature of from 700° C. to 1050° C. in an oxygen-containing atmosphere.

(7) The production process according to the above (6), wherein the large particle size cobalt hydroxide or tricobalt tetraoxide has a press density of from 1.7 to 3.0 g/cm³, and the small particle size cobalt hydroxide or tricobalt tetraoxide has a press density of from 1.7 to 3.0 g/cm³.

(8) The production process according to the above (6) or (7), wherein each of the large particle size cobalt hydroxide or tricobalt tetraoxide and the small particle size cobalt hydroxide or tricobalt tetraoxide has a specific surface area of from 2 to 20 m²/g.

(9) The production process according to any one of the above (5) to (8), wherein the large particle size or small particle size cobalt hydroxide has a half value width of the diffraction peak on (001) plane at 2θ=19±1° of from 0.18 to 0.35° and a half value width of the diffraction peak on (101) plane at 2θ=38±1° of from 0.15 to 0.35°, in an X-ray diffraction spectrum using CuKα-ray.

(10) A process for producing the positive electrode active material for a lithium secondary battery as defined in any one of the above (1) to (3), which comprises firing, as a cobalt source, a mixture of substantially spherical cobalt hydroxide or tricobalt tetraoxide having such a sharp particle size distribution that the average particle size D50 is from 7 to 20 μm, the average particle size D10 is at least 50% of the average particle size D50, the average particle size D90 is at most 150% of the average particle size D50, and the average particle size of secondary particles formed by agglomeration of primary particles is from 8 to 20 μm, and cobalt oxyhydroxide having an average particle size of secondary particles formed by agglomeration of primary particles of from 7 to 20 μm, in a proportion of from 5:1 to 1:5 as the cobalt atomic ratio, at a temperature of from 700° C. to 1050° C. in an oxygen-containing atmosphere.

(11) The production process according to the above (10), wherein the cobalt oxyhydroxide has a half value width of the diffraction peak on (220) plane at 2θ=31±1° of at least 0.80 and a half value width of the diffraction peak on (311) plane at 2θ=37±1° of at least 0.8°, in an X-ray diffraction spectrum using CuKα-ray, and has a specific surface area of from 10 to 80 m²/g.

(12) The production process according to the above (10) or (11), wherein as the cobalt hydroxide, substantially spherical cobalt hydroxide having a half value width of the diffraction peak on (001) plane at 2θ=19±1° of at least 0.150 and a half value width of the diffraction peak on (101) plane at 2θ=38±1° of at least 0.15°, in an X-ray diffraction spectrum using CuKα-ray, and having a specific surface area of from 2 to 30 m²/g, is used.

(13) The production process according to any one of the above (10) to (12), wherein the tricobalt tetraoxide has a half value width of the diffraction peak on (220) plane at 2θ=31±1° of at least 0.08° and a half value width of the diffraction peak on (311) plane at 2θ=37±1° of at least 0.10°, in an X-ray diffraction spectrum using CuKα-ray, and has a specific surface area of from 2 to 10 m²/g.

(14) The production process according to any one of the above (10) to (13), wherein the cobalt hydroxide or the tricobalt tetraoxide has a press density of from 1.2 to 2.5 g/cm³.

(15) The production process according to any one of the above (10) to (14), wherein the lithium-cobalt composite oxide has a half value width of the diffraction peak on (110) plane of from 0.07 to 0.14°, a specific surface area of from 0.3 to 0.7 m²/g, a heat generation starting temperature of at least 160° C., and a press density of from 3.1 to 3.4 g/cm³.

(16) A positive electrode for a lithium secondary battery, which contains the positive electrode active material as defined in any one of the above (1) to (4).

(17) A positive electrode for a lithium secondary battery, which contains a positive electrode active material produced by the production process as defined in any one of the above (5) to (15).

(18) A lithium secondary battery employing the positive electrode active material as defined in the above (16) or (17).

BEST MODE FOR CARRYING OUT THE INVENTION

The lithium-cobalt composite oxide for a positive electrode of a lithium secondary battery produced in the present invention is represented by the formula $Li_pCo_xM_yO_zF_a$. In the formula, M, p, x, y, z and a are as defined above. Particularly, p, x, y, z and a are preferably as follows. $0.97 \leq p \leq 1.03$, $0.990 \leq x \leq 1.0$, $0.0005 \leq y \leq 0.01$, $1.95 \leq z \leq 2.05$, $x+y=1$ and $0.0001 \leq a \leq 0.01$. Here, when a is larger than 0, it is a composite oxide having some of its oxygen atoms substituted by fluorine atoms. In such a case, the safety of the obtained positive electrode active material will be improved.

Further, M is a transition metal element other than Co, or an alkaline earth metal. The transition metal element represents a transition metal of Group 4, Group 5, Group 6, Group 7, Group 8, Group 9, Group 10 or Group 11 of the Periodic Table. Among them, M is preferably at least one element selected from the group consisting of Ti, Zr, Hf, V, Nb, Ta, Mg, Ca, Sr, Ba and Al. Among them, Ti, Zr, Hf, Mg or Al is preferred from the viewpoint of the volume development properties, the safety, the cyclic durability, etc.

In the present invention, in a case where the above element M and/or F is contained, each of the element M and F is preferably present on the surface of the lithium cobalt oxide particles. If it is present in the interior of the particles, not only the effect of improving the battery characteristics tends to be small, but also the battery characteristics may decrease in some cases. By the presence of these elements on the surface, the important battery characteristics such as the safety or the charge and discharge cyclic properties can be improved by an addition of a small amount without bringing about the reduction of the battery performance. The presence of these elements on the surface can be judged by carrying out a spectroscopic analysis such as a XPS analysis with respect to the positive electrode particles.

The positive electrode for a lithium secondary battery of the present invention is a lithium-cobalt composite oxide having the above composition, comprising a mixture of substantially spherical first particles of lithium-cobalt composite oxide having such a sharp particle size distribution that the volume basis cumulative size D10 is at least 50% of the average particle size D50 and the volume basis cumulative size D90 is at most 150% of the average particle size D50, and second particles of lithium-cobalt composite oxide filling the space among the above lithium-cobalt composite oxide particles. The first particles are required to have a narrow particle size distribution so as to achieve a large volume capacity density. With respect to the particle size distribution, D10 is preferably at least 50%, particularly preferably at least 65% of the above D50, and D90 is preferably at most 150%, particularly preferably at most 135% of the above D50. Further, the surface of the first particles is preferably as smooth as possible.

In the present invention, the average particle sizes D10, D50 and D90 are volume basis particle sizes with respect to the particle size of secondary particles formed by agglomeration and sintering of primary particles, and respectively mean the volume basis cumulative 10% size (D10), 50% size (D50) and 90% size (D90) as particle sizes at points 10%, 50% and 90% in a cumulative curve prepared by obtaining the particle size distribution on the basis of the volume and bringing the total volume to 100%. The particle size distribution can be obtained by a frequency distribution and cumulative volume distribution curve measured by a laser scattering particle size distribution measuring apparatus. For measurement of the particle size, the particles are sufficiently dispersed in an aqueous medium by e.g. ultrasonic treatment and the particle size distribution is measured (for example, Microtrac HRAX-100 manufactured by Leeds & Northrup is used). Further, in the present invention, the first particles being substantially spherical mean that the major axis/minor axis of the particles, i.e. the aspect ratio is preferably from 2/1 to 1/1, particularly preferably from 1.5/1 to 1/1. The first particles preferably have a shape as close to spheres as possible. The small particles of lithium-cobalt composite oxide do not necessarily have a specific shape but they may have various shapes such as spheres, columns and blocks.

The mixture ratio of the first particles and the second particles is required to be from 1/2 to 9/1 on the basis of mass. If the mixture ratio of the former/the latter is lower than 1/2, the press density of the mixture tends to decrease, and on the other hand, if it is higher than 9/1, the press density of the mixture tends to decrease. The mixture ratio of the former/the latter is preferably from 6/4 to 85/15, particularly preferably from 7/3 to 8/2.

In the present invention, the first particles are preferably large particles of lithium-cobalt composite oxide, and the second particles are preferably small particles of lithium-cobalt composite oxide. The large particles are required to have an average particle size D50 of from 7 to 20 µm and a substantially spherical shape. If the average particle size D50 is smaller than 7 µm, the press density of the mixed powder tends to be low, and on the other hand, if the average particle size D50 is larger than 20 µm, the discharge properties at a large current tend to decrease. Particularly, it tends to be difficult to achieve a volume capacity density. Especially, the average particle size D50 of the large particles is preferably from 9 to 15 µm, particularly preferably from 10 to 14 µm.

On the other hand, the small particles preferably have an average particle size D50 of from 10 to 30% of D50 of the above large particles. If the average particle size D50 of the small particles is smaller than 10% of D50 of the large particles, the press density of the mixture tends to decrease, and the safety tends to decrease. On the other hand, if it is larger than 30% of D50 of the large particles, the effect of improving the press density of the mixture tends to decrease. Accordingly, the average particle size D50 of the small particles is preferably from 15 to 25% of D50 of the large particles.

Further, the large particles and the small particles of lithium-cobalt composite oxide preferably have press densities of from 2.8 to 3.2 $g/cm^3$ and from 2.7 to 3.2 $g/cm^3$, respectively. In the present invention, the press density means an apparent press density when the particle powder is press-compressed under a pressure of 0.3 $t/cm^2$, unless otherwise specified. If the press density of the large particles or the small particles is lower than the above range, the press density of the mixture tends to decrease, and on the other hand, if it is higher than the above range, the discharge properties at a large current tend to decrease. It is preferred that the large particles and the small particles have press densities of from 2.9 to 3.1 $g/cm^3$ and from 2.8 to 3.0 $g/cm^3$, respectively. Further, the lithium composite oxide has a remaining alkali amount contained therein of preferably at most 0.02 mass %, particularly preferably at most 0.01 mass %.

The positive electrode active material comprising the lithium-cobalt composite oxide of the present invention may be produced by various processes. One of preferred processes is that the first particles and the second particles of the lithium-cobalt composite oxide are produced and mixed, and the obtained mixture is pressed. The first particles and the second particles are produced by various methods, and the production methods are not particularly limited, however, they are produced preferably as follows. For example, a mixture containing a cobalt source, a lithium source, and an element M source and a fluorine source used as the case requires, is fired in an oxygen-containing atmosphere. The cobalt source may, for example, be tricobalt tetraoxide, cobalt oxyhydroxide or cobalt hydroxide, and the lithium source may, for example, be lithium carbonate or lithium hydroxide. At that time, the physical property values such as the size, the shape and the particle size distribution of the lithium-cobalt composite oxide particles to be produced can be controlled particularly by controlling the particle size, the particle shape, the particle size distribution and the specific surface area of the above cobalt source.

As another preferred process for producing the positive electrode active material comprising the lithium-cobalt composite oxide of the present invention, the following process may be mentioned. Namely, substantially spherical large particles of cobalt hydroxide or tricobalt tetraoxide having such a sharp particle size distribution that the average particle size D50 is from 7 to 20 μm, the average particle size D10 is at least 50% of the average particle size D50, and the average particle size D90 is at most 150% of the average particle size D50, and small particles of cobalt hydroxide or tricobalt tetraoxide having an average particle size D50 of from 10 to 30% of the average particle size D50 of the large particles are mixed in a proportion of from 9:1 to 1:2 as the cobalt atomic ratio. A mixture comprising the obtained mixture and a lithium source, and a material of the element M and a fluorine source used as the case requires, added, is fired in an oxygen-containing atmosphere at from 700 to 1,050° C., particularly preferably from 900 to 1,000° C., for preferably from 5 to 20 hours.

In such a case, the large particles of cobalt hydroxide or tricobalt tetraoxide are required to have an average particle size D10 of at least 50% of the average particle size D50 and an average particle size D90 of at most 150% of the average particle size D50, whereby an effect of improving the press density of the positive electrode will be obtained. Further, it is preferred that the large particles of cobalt hydroxide or tricobalt tetraoxide have a press density of from 1.7 to 3.0 g/cm$^3$ and that the small particles of cobalt hydroxide or tricobalt tetraoxide have a press density of from 1.7 to 3.0 g/cm$^3$. Further, it is preferred that each of the large particles and the small particles of cobalt hydroxide or tricobalt tetraoxide have a specific surface area of from 2 to 20 m$^2$/g.

Further, the large particles of cobalt hydroxide or the small particles of cobalt hydroxide have, in an X-ray diffraction spectrum using CuKα-ray, a half value width of the diffraction peak on (001) plane at 2θ=19.1±1° of preferably from 0.18 to 0.35°, particularly preferably from 0.22 to 0.30°, and a half value width of the diffraction peak on (101) plane at 2θ=38±1° of preferably from 0.15 to 0.35°, particularly preferably from 0.18 to 0.30°. When the half value widths are within the above ranges, effects of improving the safety and the press density of the positive electrode will be obtained.

Still another preferred process for producing the positive electrode active material comprising the lithium-cobalt composite oxide of the present invention is as follows. Namely, as a cobalt source, a mixture containing substantially spherical cobalt hydroxide or tricobalt tetraoxide having such a sharp particle size distribution that the average particle size D50 is from 7 to 20 μm, the average particle size D10 is at least 50% of the average particle size D50, the average particle size D90 is at most 150% of the average particle size D50, and the average particle size of secondary particles formed by agglomeration of primary particles is from 8 to 20 μm, and cobalt oxyhydroxide having an average particle size of secondary particles formed by agglomeration of primary particles of from 7 to 20 μm, in a proportion of from 5:1 to 1:5 as the cobalt atomic ratio, is used, and the mixture is fired in an oxygen-containing atmosphere at from 700 to 1,050° C.

The cobalt oxyhydroxide is required to have an average particle size of secondary particles formed by agglomeration of primary particles of from 7 to 20 μm, preferably from 9 to 14 μm. If the average particle size of the secondary particles is smaller than 7 μm, the press density of the positive electrode tends to decrease, and on the other hand, if it exceeds 20 μm, the large current discharge properties tend to decrease. In the present invention, the shape of the particles being substantially spherical includes a spherical shape, a rugby ball shape, a polygonal shape, etc. The major axis/minor axis, i.e. the aspect ratio is preferably from 3/1 to 1/1, particularly preferably from 2.0/1 to 1/1. Especially, the particles preferably have a shape as spherical as possible.

The cobalt oxyhydroxide has, in an X-ray diffraction spectrum using CuKα-ray, a half value width of the diffraction peak on (220) plane at 2θ=31±1° of preferably at least 0.8°, particularly preferably at least 1.0°, and have a half value width of the diffraction peak on (311) plane at 2θ=37±1° of preferably at least 0.8°, particularly preferably at least 1.1°. If the half value width out of the above range, the powder will be bulky during lithiation, the discharge properties may decrease, or the safety may deteriorate. Further, the specific surface area is preferably from 10 to 80 m$^2$/g, particularly preferably from 30 to 60 m$^2$/g.

The cobalt hydroxide or tricobalt tetraoxide to be mixed with the cobalt oxyhydroxide is required to have a substantially spherical shape with an average particle size of secondary particles formed by agglomeration of primary particles of from 7 to 20 μm, preferably from 9 to 15 μm. If the average particle size of the secondary particles is smaller than 8 μm, the press density of a lithiated product tends to decrease. On the other hand, if it exceeds 20 μm, the discharge properties at a large current may decrease, or a smooth electrode surface is hardly formed. The shape of such particles is also preferably substantially spherical.

The cobalt hydroxide or tricobalt tetraoxide preferably has a narrow particle size distribution. In such a case, the produced cobalt-lithium composite oxide has a press density higher than expected. It is considered to be because when the particle size distribution is narrow, the cobalt hydroxide or tricobalt tetraoxide itself is likely to be highly packed when a pressure is applied from the outside, and thus a high packing fraction of secondary particles can be obtained. Accordingly, the cobalt hydroxide or tricobalt tetraoxide has an average particle size D10 of at least 50%, preferably at least 65% of the average particle size D50, and an average particle size D90 of at most 150%, preferably at most 135% of the average particle size D50. Further, the cobalt hydroxide or the tricobalt tetraoxide preferably has a press density of from 1.2 to 2.5 g/cm$^3$.

Further, the cobalt hydroxide has, in an X-ray diffraction spectrum using CuKα-ray, a half value width of the diffraction peak on (001) plane at 2θ=19±1° of preferably at least 0.15°, particularly preferably at least 0.20°, and a half value width of the diffraction peak on (101) plane at 2θ=38±1° of preferably at least 0.15°, particularly preferably at least 0.20°. Further, the specific surface area is preferably from 2 to 30 m$^2$/g, particularly preferably from 3 to 8 m$^2$/g.

On the other hand, the tricobalt tetraoxide has, in an X-ray diffraction spectrum using CuKα-ray, a half value width of the diffraction peak on (220) plane at 2θ=31±1° of preferably at least 0.08°, particularly preferably at least 0.10°, and a half value width of the diffraction peak on (311) plane at 2θ=37±1° of preferably at least 0.1°, particularly preferably at least 0.12°. Further, the specific surface area is preferably from 2 to 10 m$^2$/g, particularly preferably from 3 to 8 m$^2$/g.

In the present invention, a mixture containing the cobalt oxyhydroxide and the cobalt hydroxide or tricobalt tetraoxide, is used as a cobalt source. In this case, the proportion of the former/the latter is from 5/1 to 1/5 on the basis of the cobalt atomic ratio. If the proportion is higher than 5/1, the press density of the positive electrode powder tends to decrease, and on the other hand, if it is lower than 1/5, the press density of the positive electrode powder tends to decrease. Especially, the proportion is preferably from 2/1 to 1/3.

The cobalt oxyhydroxide, cobalt hydroxide and tricobalt tetraoxide having the above specific physical properties, to be used for production of the lithium-cobalt composite oxide of the present invention may be produced by various methods, and the production methods are not particularly limited. For example, the cobalt oxyhydroxide is prepared by adding an oxidizing agent and caustic soda and ammonium hydroxide to an aqueous solution containing bivalent cobalt such as cobalt chloride or cobalt sulfate. Otherwise, it may be produced by a method of firstly preparing cobalt hydroxide without adding an oxidizing agent and then reacting an oxidizing agent. Further, with respect to the cobalt hydroxide, by continuously mixing a mixture of an aqueous cobalt sulfate solution and ammonium hydroxide, with an aqueous sodium hydroxide solution, a slurry containing cobalt hydroxide can easily be produced. And, at that time, by changing reaction conditions such as the pH or stirring, the cobalt hydroxide having the physical properties of the present invention can be obtained. Further, the tricobalt tetraoxide is also produced, for example, by oxidizing the cobalt hydroxide, and at that time, by changing the crystal structure of the cobalt hydroxide as a material or the oxidizing conditions, various oxides may be produced.

In the present invention, preferred as the lithium source is lithium carbonate. If a lithium source other than lithium carbonate, for example lithium hydroxide is used, the material will be expensive. The lithium carbonate is preferably in a form of a powder having an average particle size D50 of from 1 to 50 μm and a specific surface area of from 0.1 to 10 m$^2$/g. On the other hand, the material of the element M used as the case requires, a hydroxide, an oxide, a carbonate or a fluoride is preferably selected. As the fluorine source, a metal fluoride, LiF, MgF$_2$ etc. is selected.

Preferably, the lithium-cobalt composite oxide of the present invention thus produced, has an average particle size D50 of preferably from 5 to 15 μm, particularly preferably from 8 to 12 μm, a specific surface area of preferably from 0.3 to 0.7 m$^2$/g, particularly preferably from 0.4 to 0.6 m$^2$/g, a half value width of the diffraction peak on (110) plane at 2θ=66.5±1° of preferably from 0.07 to 0.14°, particularly preferably from 0.08 to 0.12° as measured by means of X-ray diffraction using CuKα as a radiation source, and a press density of preferably from 3.15 to 3.40 g/cm$^3$, particularly preferably from 3.20 to 3.35 g/cm$^3$. Further, the lithium-cobalt composite oxide of the present invention has a remaining alkali amount contained therein, of preferably at most 0.03 mass %, particularly preferably at most 0.01 mass %.

To produce a positive electrode for a lithium secondary battery from the lithium-cobalt composite oxide of the present invention, a carbon type conductive material such as acetylene black, graphite or Ketjenblack and a binding material are mixed with a powder of the composite oxide. As the binding material, preferably polyvinylidene fluoride, polytetrafluoroethylene, polyamide, carboxymethyl cellulose or acrylic resin may, for example, be used. The powder of the lithium-cobalt composite oxide, the conductive material and the binding material are formed into a slurry or a kneaded product by using a solvent or a dispersion medium, which is supported on a positive electrode current collector such as aluminum foil or stainless steel foil by e.g. coating to form a positive electrode plate for a lithium secondary battery.

In a lithium secondary battery using the lithium-cobalt composite oxide of the present invention as the positive electrode active material, as the separator, a porous polyethylene or a porous propylene film may be used. Further, as a solvent of the electrolyte solution of the battery, various solvents may be used. However, a carbonate ester is preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, the carbonate ester may be used alone or by mixing at least two types. Further, it may be used by mixing with another solvent. Further, according to the material of the negative electrode active material, if the chain carbonate ester is used together with the cyclic carbonate ester, there is a case where the discharge properties, the cyclic durability or the charge and discharge efficiency can be improved.

Further, in the lithium secondary battery using the lithium-cobalt composite oxide of the present invention as the positive electrode active material, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolyte solvent or the polymer electrolyte, at least one member of lithium salts is preferably used, wherein e.g. $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$ is anion. It is preferably added at a concentration of from 0.2 to 2.0 mol/L to the electrolyte solvent or the polymer electrolyte comprising the lithium salt. If the concentration departs from this range, ionic conductivity will decrease, and the electrical conductivity of the electrolyte will decrease. More preferably, it is from 0.5 to 1.5 mol/L.

In the lithium battery using the lithium-cobalt composite oxide of the present invention as the positive electrode active material, as the negative electrode active material, a material which can occlude and discharge lithium ions may be used. The material forming the negative electrode active material is not particularly limited, however, lithium metal, a lithium alloy, a carbon material, an oxide comprising, as a main body, a metal of Group 14 or Group 15 of the Periodic Table, a carbon compound, a silicon carbide compound, a silicone oxide compound, titanium sulfide or a boron carbide compound may, for example, be mentioned. As the carbon material, an organic material which is subjected to thermal decomposition under various thermal decomposition conditions, artificial graphite, natural graphite, soil graphite, exfoliated graphite or squamation graphite etc. can be used. Further, as the oxide, a compound comprising tin oxide as a main body can be used. As the negative electrode current collector, a copper foil, a nickel foil etc. can be used. The negative electrode is produced preferably by kneading the active material with an organic solvent to form a slurry, which is coated on the metal foil current collector, dried and pressed.

The shape of the lithium battery using the lithium-cobalt composite oxide of the present invention as the positive electrode active material is not particularly limited. Sheet, film, folding, winding type cylinder with bottom or button shape etc. is selected according to use.

Now, the present invention will be explained in further detail with reference to Examples. However, the present invention is by no means restricted to such specific Examples. Examples 1 to 4, 10 to 13, 15 to 21 and 25 to 27 are Examples of the present invention, and Examples 5 to 9, 14 and 22 to 24 are Comparative Examples.

EXAMPLE 1

A spherical cobalt hydroxide powder formed by agglomeration of primary particles having, in powder X-ray diffraction using CuKα-ray, a half value width of the diffraction peak on (001) plane at 2θ=19±1° of 0.28° and a half value width of the diffraction peak on (101) plane at 2θ=38±1° of 0.21°, average particle sizes D50 of 16.7 μm, D10 of 13.4 μm and D90 of 21.1 μm, and a specific surface area of 3.6 m$^2$/g, and a lithium carbonate powder having a specific surface area of 1.2 m$^2$/g, were mixed. They were blended in such a mixture ratio that the composition would be LiCoO$_2$ after firing. After dry mixing of these two types of powders, the mixture was fired in the air atmosphere at 950° C. for 12 hours.

The fired product was crushed, and the particle size distribution of the obtained large particle size LiCoO$_2$ powder formed by agglomeration of primary particles was measured by using a laser scattering type particle size distribution measuring apparatus and as a result, the average particle size D50 was 13.4 μm, D10 was 10.2 μm, and D90 was 17.4 μm, and a large particle size spherical LiCoO$_2$ powder having a specific surface area of 0.32 m$^2$/g as obtained by BET method was obtained. The LiCoO$_2$ powder had D10/D50 of 76% and D90/D50 of 130%, and has a considerably narrow particle size distribution.

With respect to the LiCoO$_2$ powder, observation by an electron microscope at magnifications of 1,000 and 5,000 was carried out, to measure the average of the proportion of the major axis to the minor axis (aspect ratio) of 500 spherical particles at each magnification. As a result, the average was 1.16, and the powder was found to have a shape close to spheres. The surface was smooth. With respect to the LiCoO$_2$ powder, an X-ray diffraction spectrum was obtained by using an X-ray diffraction apparatus (RINT 2100 manufactured by Rigaku Corporation). In powder X-ray diffraction using CuKα-ray, the half value width of the diffraction peak on (110) plane at 2θ=66.5±1° was 0.089°. The above large particle size spherical LiCoO$_2$ powder will be referred to as "powder is A".

On the other hand, a particulate cobalt hydroxide powder having average particle sizes D50 of 0.6 μm, D10 of 0.3 μm and D90 of 1.3 μm and a specific surface area of 17.1 m$^2$/g, and a lithium carbonate powder having a specific surface area of 1.2 m$^2$/g, were mixed. They were blended in such a mixture ratio that the composition would be LiCoO$_2$ after firing. After dry mixing of these two types of powders, the mixture was fired in the air atmosphere at 950° C. for 12 hours. The fired product was crushed, and the particle size distribution of the obtained small particle size LiCoO$_2$ powder was measured by using a laser scattering type particle size distribution measuring apparatus and as a result, the average particle size D50 was 2.6 μm, D10 was 1.5 μm and D90 was 5.6 μm, and an aggregated LiCoO$_2$ powder having a specific surface area of 0.53 m$^2$/g as obtained by BET method was obtained.

With respect to this aggregated LiCoO$_2$ powder, observation by an electron microscope at magnifications of 1,000, 5,000 and 10,000 was carried out and as a result, it was found that from about 3 to about 20 particles of from 2 to 4 μm were agglomerated to form a non-spherical aggregate. With respect to the LiCoO$_2$ powder, an X-ray diffraction spectrum was obtained by using an X-ray diffraction apparatus (RINT 2100 manufactured by Rigaku Corporation). In powder X-ray diffraction using CuKα-ray, the half value width of the diffraction peak on (110) plane at 2θ=66.5±1° was 0.097°. The above small particle size spherical LiCoO$_2$ powder will be referred to as "powder B". The powder B had a D50 of 19% of D50 of the powder A. 60 Parts by weight of the powder A and 40 parts by weight of the powder B were mixed, and the obtained mixed powder was pressed by an oil hydraulic pressing machine under 0.3 t/cm$^2$, whereupon the apparent density after pressing was 3.20 g/cm$^3$. 10 g of the LiCoO$_2$ powder was dispersed in 100 g of pure water, and after filtration, the remaining alkali amount was obtained by potentiometric titration with 0.1 N HCl and found to be 0.02 wt %.

The above LiCoO$_2$ mixed powder, acetylene black and a polyvinylidene fluoride powder were mixed in a mass ratio of 90/5/5, and N-methylpyrrolidone was added thereto to prepare a slurry, which was coated on one side of an aluminum foil having a thickness of 20 μm by using a Doctor Blade. After drying, roll press rolling was carried out once to prepare a positive electrode body sheet for a lithium battery. The density of the electrode layer was measured from the thickness of the positive electrode body after rolling and the weight per unit area of the electrode layer and found to be 3.37 g/cm$^3$.

Then, using one punched out from the positive electrode body sheet as a positive electrode, using a metal lithium foil with a thickness of 500 μm as a negative electrode, using 20 μm of a nickel foil as a negative electrode current collector, using a porous polypropylene with a thickness of 25 μm as a separator, and using as an electrolyte solution a 1M LiPF$_6$/EC+DEC (1:1) solution (it means a mixed solution of EC and DEC in a mass ratio (1:1) comprising LiPF$_6$ as a solute, the same applies hereinafter), two pieces of simplifying sealed cell type lithium batteries made of stainless steel were assembled in an argon globe box.

One of these batteries employing the EC+DEC (1:1) solution as the electrolyte solution was charged up to 4.3 V at a load current of 75 mA per 1 g of the positive electrode active material at 25° C., and discharged down to 2.5 V at a load current of 75 mA per 1 g of the positive electrode active material, whereby the initial discharge capacity was obtained. Further, the volume capacity density was obtained from the density of the electrode layer and the capacity per weight. With respect to this battery, the charge and discharge cycle test was further carried out 30 times. As a result, the initial volume capacity density of the positive electrode layer at 25° C. at a voltage of from 2.5 to 4.3 V was 451 mAh/cm$^3$ electrode layer, the initial weight capacity density was 159 mAh/g-LiCoO$_2$, and the capacity retention ratio after 30 times of charge and discharge cycle, was 97.3%. Further, with respect to the other battery employing the EC+DEC (1:1) solution as the electrolyte solution, the other battery was charged for 10 hours at 4.3 V, and then broken down in the argon globe box. The positive electrode body sheet was picked up after charge, and after the positive electrode body sheet was washed, it was punched out at a radius of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged product was 160° C.

EXAMPLE 2

A mixed powder was obtained in the same manner as in Example 1 except that 80 parts by weight of the powder A and 20 parts by weight of the powder B were mixed. The mixed powder after pressing had an apparent density of 3.23 g/cm$^3$. Further, by using this powder, in the same manner as in Example 1, a positive electrode was produced, batteries were assembled, and the properties were measured. The weight capacity density was 160 mAh/g, the capacity retention ratio after 30 times of charge and discharge cycle was 97.5%, and the heat generation starting temperature was 163° C.

EXAMPLE 3

A mixed powder was obtained in the same manner as in Example 1 except that 40 parts by weight of the powder A and 60 parts by weight of the powder B were mixed. The mixed powder after pressing had an apparent density of 3.13 g/cm³. Further, by using this powder, in the same manner as in Example 1, a positive electrode was produced, batteries were assembled, and the properties were measured. The weight capacity density was 160 mAh/g, the capacity retention ratio after 30 times of charge and discharge cycle was 97.2%, and the heat generation starting temperature was 163° C.

EXAMPLE 4

In Example 1, a spherical cobalt hydroxide powder from a material having a different particle size distribution was used as the material cobalt hydroxide for large particles, instead of the powder A. In the same manner as in Example 1, the powder was mixed with lithium carbonate and fired, and the fired product was crushed, and the particle size distribution of the obtained large particle size $LiCoO_2$ powder was measured by using a laser scattering type particle size distribution measuring apparatus and as a result, the average particle size D50 was 13.0 µm, D10 was 7.9 µm and D90 was 18.9 µm, and a large particle size spherical $LiCoO_2$ powder having a specific surface area of 0.35 m²/g as obtained by BET method was obtained. This $LiCoO_2$ powder had D10/D50 of 61% and D90/D50 of 145%, and has a narrow particle size distribution.

With respect to this $LiCoO_2$ powder, observation by an electron microscope at magnifications of 1,000 and 5,000 was carried out to measure the average of the proportion of the major axis to the minor axis (aspect ratio) of 500 spherical particles at each magnification. As a result, the average was 1.14, and the particles were found to have a shape close to spheres. The above large particle size spherical $LiCoO_2$ powder will be referred to as "powder E". A mixed powder was obtained in the same manner as in Example 1 except that 60 parts by weight of the powder E and 40 parts by weight of the powder B were mixed. The powder B had a D50 of 20% of D50 of the powder E. The mixed powder after pressing had an apparent density of 3.14 g/cm³.

Further, by using this powder, in the same manner as in Example 1, a positive electrode was produced, batteries were assembled, and the properties were measured. The weight capacity density was 160 mAh/g, the capacity retention ratio after 30 times of charge and discharge cycle was 97.4%, and the heat generation starting temperature was 161° C.

EXAMPLE 5

The apparent density after pressing obtained in the same manner as in Example 1 except that the powder A alone was used in Example 1 was 2.95 g/cm³. By using this powder, in the same manner as in Example 1, a positive electrode was produced, batteries were assembled, and the properties were measured. The initial weight capacity density was 160 mAh/g-$LiCoO_2$, the capacity retention ratio after 30 times of charge and discharge cycle was 97.1%, and the heat generation starting temperature of a 4.3 V charged product was 163° C.

EXAMPLE 6

The apparent density after pressing obtained in the same manner as in Example 1 except that the powder B alone was used in Example 1 was 2.78 g.cm³. By using this powder, in the same manner as in Example 1, a positive electrode was produced, batteries were assembled, and the properties were measured. The initial weight capacity density was 159 mAh/g-$LiCoO_2$, the capacity retention ratio after 30 times of charge and discharge cycle was 97.0%, and the heat generation starting temperature of a 4.3 V charged product was 158° C.

EXAMPLE 7

A mixed powder was obtained in the same manner as in Example 1 except that 20 parts by weight of the powder A and 80 parts by weight of the powder B were mixed in Example 1. The mixed powder after pressing had an apparent density of 3.03 g/cm³. Further, by using this powder, in the same manner as in Example 1, a positive electrode was produced, batteries were assembled, and the properties were measured. The weight capacity density was 159 mAh/g, the capacity retention ratio after 30 times of charge and discharge cycle was 97.0%, and the heat generation starting temperature was 159° C.

EXAMPLE 8

A mixed powder was obtained in the same manner as in Example 1 except that 95 parts by weight of the powder A and 5 parts by weight of the powder B were mixed in Example 1. The mixed powder after pressing had an apparent density of 3.05 g/cm³. Further, by using this powder, in the same manner as in Example 1, a positive electrode was produced, batteries were assembled, and the properties were measured. The weight capacity density was 159 mAh/g, the capacity retention ratio after 30 times of charge and discharge cycle was 97.0%, and the heat generation starting temperature was 158° C.

EXAMPLE 9

The apparent density after pressing obtained in the same manner as in Example 1 except that the powder E alone was used in Example 4 was 3.02 g/cm³. Further, by using this powder, in the same manner as in Example 1, a positive electrode was produced, batteries were assembled, and the properties were measured. The weight capacity density was 159 mAh/g, the capacity retention ratio after 30 times of charge and discharge cycle was 97.0%, and the heat generation starting temperature was 160° C.

EXAMPLE 10

Commercially available cobalt hydroxide was used as small particle size cobalt hydroxide. As a result of observation by a scanning electron microscope of the small particle size cobalt hydroxide, it was found that aggregated secondary particles consisting of several to about twenty primary particles were formed. The cobalt hydroxide particles consisting of the secondary particles had a specific surface area of 2.4 m²/g, and had an apparent density of 2.21 g/cm³ after pressed by an oil hydraulic pressing machine under 0.3 t/cm². The small particle size cobalt hydroxide had, in powder X-ray diffraction using CuKα-ray, a half value width of the diffraction peak on (001) plane at $2\theta=19\pm1°$ of 0.16° and a half value width of the diffraction peak on (101) plane at $2\theta=38\pm1°$ of 0.15°. The particle size distribution of the powder of the secondary particles was measured by using a laser scattering type particle size distribution measuring apparatus employing water as a dispersion medium and as a result, the average particle size D50 was 3.5 µm, D10 was 0.3 µm and D90 was 7.6 µm.

On the other hand, a mixed liquid of an aqueous cobalt sulfate solution and ammonium hydroxide, and an aqueous caustic soda solution, were continuously mixed to continuously synthesize a cobalt hydroxide slurry by a known method, and by means of aggregation, filtration and drying steps, a large particle size substantially spherical cobalt hydroxide powder was obtained. The obtained cobalt hydroxide had, in powder X-ray diffraction using CuKα-ray, a half value width of the diffraction peak on (001) plane at 2θ=19±1° of 0.280 and a half value width of the diffraction peak on (101) plane at 2θ=38±1° of 0.21°. The particle size distribution of the powder of the secondary particles was measured by using a laser scattering type particle size distribution measuring apparatus employing water as a dispersion medium and as a result, the average particle size D50 was 16.7 µm, D10 was 13.4 µm and D90 was 21.1 µm, and D10 was 80% of D50 and D90 was 126% of D50. Further, the specific surface area was 3.6 m$^2$/g, the press density was 2.11 g/cm$^3$, and as a result of observation by a scanning electron microscope, the powder was a cobalt hydroxide powder consisting of substantially spherical large particles formed by strong agglomeration of dozens or more needle primary particles. Further, the aspect ratio was obtained with respect to 500 particles and as a result, the proportion of major axis/minor axis was 1.20/1 on the average.

These two types of cobalt hydroxide powders and a lithium carbonate powder having a specific surface area of 1.2 m$^2$/g were mixed. The mixture ratio of the large particle size cobalt hydroxide to the small particle size cobalt hydroxide was 75:25 (weight ratio). The small particle size cobalt hydroxide had a D50 of 21% of D50 of the large particle size cobalt hydroxide. These two types of the cobalt hydroxide powders and the lithium carbonate powder were blended in such a mixture ratio that the composition would be LiCoO$_2$ after firing. After dry mixing of these three types of powders, the mixture was fired in the air atmosphere at 950° C. for 12 hours. The fired product was crushed, and the particle size distribution of the obtained LiCoO$_2$ powder formed by agglomeration of the primary particles was measured by using a laser scattering type particle size distribution measuring apparatus employing water as a dispersion medium and as a result, the average particle size D50 was 14.6 µm, D10 was 12.1 µm and D90 was 18.0 µm, and a LiCoO$_2$ powder having a specific surface area of 0.37 m$^2$/g as obtained by BET method was obtained.

With respect to the LiCoO$_2$ powder, an X-ray diffraction spectrum was obtained by using an X-ray diffraction apparatus (RINT 2100 manufactured by Rigaku Corporation). In powder X-ray diffraction using CuKα-ray, the half value width of the diffraction peak on (110) plane at 2θ=66.5±1° was 0.101°. The LiCoO$_2$ powder had a press density of 3.27 g/cm$^3$. The alkali content was 0.02 wt %.

By using the above LiCoO$_2$ powder, in the same manner as in Example 1, a positive electrode was produced, batteries were assembled, and the properties were measured. The initial volume capacity density was 465 mAh/cm$^3$ electrode layer, the initial weight capacity density was 160 mAh/g-LiCoO$_2$, the capacity retention ratio after 30 times of charge and discharge cycle was 97.2%, and the heat generation starting temperature was 161° C.

EXAMPLE 11

In the same manner as in Example 1 except that the mixture ratio of the large particle size cobalt hydroxide to the small particle size cobalt hydroxide was 50:50 (weight ratio) in Example 10, a LiCoO$_2$ powder was synthesized. The small particle size cobalt hydroxide had a D50 of 21% of D50 of the large particle size cobalt hydroxide. The cobalt hydroxide powders and the cobalt carbonate were blended in such a mixture ratio that the composition would be LiCoO$_2$ after firing. LiCoO$_2$ had average particle sizes D50 of 12.5 µm, D10 of 10.3 µm and D90 of 17.2 µm, and a LiCoO$_2$ powder having a specific surface area of 0.42 m$^2$/g as obtained by BET method was obtained. With respect to the LiCoO$_2$ powder, an X-ray diffraction spectrum was obtained by using an X-ray diffraction apparatus (RINT 2100 manufactured by Rigaku Corporation). In powder X-ray diffraction using CuKα-ray, the half value width of the diffraction peak on (110) plane at 2θ=66.5±1° was 0.102°. The obtained LiCoO$_2$ powder had a press density of 3.24 g/cm$^3$.

By using this powder, in the same manner as in Example 1, a positive electrode was produced, batteries were assembled, and the properties were measured. The initial weight capacity density was 161 mAh/g-LiCo$_2$, and the capacity retention ratio after 30 times of charge and discharge cycle was 97.5%. Further, the heat generation starting temperature of a 4.3 V charged product was 162° C.

EXAMPLE 12

In Example 10, large particle size cobalt hydroxide was fired in the air atmosphere at a firing temperature of 900° C. for 12 hours to synthesize large particle size substantially spherical tricobalt tetraoxide. The synthesized tricobalt tetraoxide had, in powder X-ray diffraction using CuKα-ray, the half value width of the diffraction peak on (220) plane at 2θ=31±1° of 0.15° and a half value width of the diffraction peak on (311) plane at 2θ=37±1° of 0.16°. As a result of measurement by using a laser scattering type particle size distribution measuring apparatus employing water as a dispersion medium, the average particle size D50 was 15.5 µm, D10 was 12.8 µm and D90 was 19.1 µm, the specific surface area was 3.6 m$^2$/g, the press density was 2.30 g/cm$^3$, and the powder was a substantially spherical tricobalt tetraoxide powder formed by strong agglomeration of needle primary particles.

In the same manner as in Example 11 except that the substantially spherical large particle size tricobalt tetraoxide powder and the small particle size cobalt hydroxide of Example 11 were used, a LiCoO$_2$ powder was synthesized. The mixture ratio of the tricobalt tetraoxide powder to the small particle size cobalt hydroxide of Example 11 was 75:25 as the cobalt atomic ratio. The small particle size cobalt hydroxide had a D50 of 23% of D50 of the large particle size tricobalt tetraoxide. The cobalt hydroxide, the tricobalt tetraoxide and lithium carbonate were blended in such a mixture ratio that the composition would be LiCoO$_2$ after firing. As a result of measurement by using a laser scattering type particle size distribution measuring apparatus employing water as a dispersion medium, LiCoO$_2$ had average particle sizes D50 of 14.3 µm, D10 of 11.5 µm and D90 of 18.1 µm, and a LiCoO$_2$ powder having a specific surface area of 0.40 m$^2$/g as obtained by BET method was obtained. With respect to the LiCoO$_2$ powder, an X-ray diffraction spectrum was obtained by using an X-ray diffraction apparatus (RINT 2100 manufactured by Rigaku Corporation). In powder X-ray diffraction using CuKα-ray, the half value width of the diffraction peak on (110) plane at 2θ=66.5±1° was 0.099°. The obtained LiCoO$_2$ powder had a press density of 3.26 g/cm$^3$.

By using this powder, in the same manner as in Example 1, a positive electrode was produced, batteries were assembled, and the properties were measured. The initial weight capacity density was 161 mAh/g-LiCoO$_2$, the capacity retention ratio after 30 times of charge and discharge cycle was 97%. Further, the heat generation starting temperature of a 4.3 V charged product was 164° C.

EXAMPLE 13

In the same manner as in Example 11 except that a titanium oxide powder and a lithium fluoride powder were further added when the two types of the cobalt hydroxide powders and the lithium carbonate powder were mixed in Example 10, a positive electrode active material was synthesized. As a result of elemental analysis, the positive electrode active material was found to be $LiCo_{0.997}Ti_{0.003}O_{1.998}F_{0.002}$. The fired product was crushed, and the particle size distribution of the obtained powder of the above composition, formed by agglomeration of primary particles, was measured by using a laser scattering type particle size distribution measuring apparatus employing water as a dispersion medium and as a result, the average particle size D50 was 13.2 μm, D10 was 10.1 μm and D90 was 16.3 μm, and a substantially spherical $LiCoO_2$ powder having a specific surface area of 0.48 m²/g as obtained by BET method was obtained.

With respect to the above powder, an X-ray diffraction spectrum was obtained by using an X-ray diffraction apparatus (RINT 2100 manufactured by Rigaku Corporation). In powder X-ray diffraction using CuKα-ray, the half value width of the diffraction peak on (110) plane at 2θ=66.5±1° was 0.125°. The powder had an apparent density of 3.26 g/cm³ after pressed by an oil hydraulic pressing machine under 0.3 t/cm². As a result of spectral analysis, titanium and fluorine were found to be localized on the surface. The positive electrode had a remaining alkali amount of 0.02 mass %.

By using the above powder, in the same manner as in Example 1, a positive electrode was produced, batteries were assembled, and the properties were measured. The initial weight capacity density was 161 mAh/g-$LiCoO_2$, and the capacity retention ratio after 30 times of charge and discharge cycle was 99.5%. Further, the heat generation starting temperature of a 4.3 V charged product was 178° C.

EXAMPLE 14

In the same manner as in Example 1 except that no small particle size cobalt hydroxide was used and large particle size tricobalt tetraoxide alone was used as a cobalt source in Example 12, $LiCoO_2$ was synthesized. The tricobalt tetraoxide and the cobalt carbonate were blended in such a mixture ratio that the composition would be $LiCoO_2$ after firing. The obtained $LiCoO_2$ powder had an apparent density of 2.95 g/cm³ after pressing. By using this powder, in the same manner as in Example 1, a positive electrode was produced, batteries were assembled, and the properties were measured. The initial weight capacity density was 161 mAh/g-$LiCoO_2$, and the capacity retention ratio after 30 times of charge and discharge cycle was 97.2%. Further, the heat generation starting temperature of a 4.3 V charged product was 162° C.

EXAMPLE 15

A positive electrode active material was synthesized in the same manner as in Example 13 except that aluminum hydroxide was used instead of titanium oxide in Example 13. As a result of chemical analysis, the positive electrode active material was found to be $LiCO_{0.997}Al_{0.003}O_{1.998}F_{0.002}$, and the powder had a press density of 3.25 g/cm³. Further, aluminum and fluorine were found to be present on the surface. The remaining alkali amount was 0.02 mass %.

By using this powder, in the same manner as in Example 1, a positive electrode was produced, batteries were assembled, and the properties were measured. The initial capacity was 160 mAh/g, the capacity retention ratio after 30 cycles was 99.3%, and the heat generation starting temperature was 179° C.

EXAMPLE 16

A positive electrode active material was synthesized in the same manner as in Example 13 except that magnesium hydroxide was used instead of titanium oxide in Example 13. As a result of chemical analysis, the positive electrode active material was found to be $LiCo_{0.997}Mg_{0.003}O_{1.998}F_{0.002}$, and the powder had a press density of 3.25 g/cm³. Further, magnesium and fluorine were found to be present on the surface. The remaining alkali amount was 0.02 mass %.

By using this powder, in the same manner as in Example 1, a positive electrode was produced, batteries were assembled, and the properties were measured. The initial capacity was 161 mAh/g, the capacity retention ratio after 30 cycles was 99.7%, and the heat generation starting temperature was 187° C.

EXAMPLE 17

A positive electrode active material was synthesized in the same manner as in Example 13 except that zirconium oxide was used instead of titanium oxide in Example 13. As a result of chemical analysis, the positive electrode active material was found to be $LiCo_{0.997}Zr_{0.003}O_{1.998}F_{0.002}$, and the powder had a press density of 3.26 g/cm³. Further, zirconium and fluorine were found to be present on the surface. The remaining alkali amount was 0.02 mass %. By using this powder, in the same manner as in Example 1, a positive electrode was produced, batteries were assembled, and the properties were measured. The initial capacity was 160 mAh/g, the capacity retention ratio after 30 cycles was 99.5%, and the heat generation starting temperature was 174° C.

EXAMPLE 18

A mixed liquid of an aqueous cobalt sulfate solution and ammonium hydroxide and an aqueous caustic soda solution were continuously mixed to continuously synthesize a cobalt hydroxide slurry by a known method, and by means of agglomeration, filtration and drying steps, a cobalt hydroxide powder was obtained. The obtained cobalt hydroxide had, in powder X-ray diffraction using CuKα-ray, a half value width of the diffraction peak on (001) plane at 2θ=19±1° of 0.28° and a half value width of the diffraction peak on (101) plane at 2θ=38±1° of 0.21°. The particle size distribution of the powder of secondary particles was measured by using a laser scattering type particle size distribution measuring apparatus employing water as a dispersion medium and as a result, the average particle size D50 was 16.5 μm, D10 was 13.2 μm and D90 was 21.0 μm, and accordingly D10 was 80% of D50 and D90 was 127% of D50. Further, the tap density was 2.1 g/cm³, the press density was 2.11 g/cm³, and the powder was a substantially spherical cobalt hydroxide powder formed by strong agglomeration of needle primary particles. 500 Cobalt hydroxide particles were observed by a scanning electron microscope and as a result, the aspect ratio (proportion of major axis/minor axis) was 1.21, and the particles were substantially spherical.

In the present invention, the tap density was obtained in accordance with the heavy bulk density as defined in JIS R9301-2-3.

Further, as cobalt oxyhydroxide, cobalt oxyhydroxide having average primary particle sizes D50 of 11.7 μm, D10 of 4.9 μm and D90 of 16.5 μm, having a half value width of the diffraction peak on (220) plane at 2θ=31±1° of 1.32° and a half value width of the diffraction peak on (311) plane at 2θ=37±1° of 1.35°, and having a specific surface area of 45 m$^2$/g was used.

The above cobalt oxyhydroxide, the above cobalt hydroxide and a lithium carbonate powder having a specific surface area of 1.2 m$^2$/g were mixed. The mixture ratio of the former cobalt oxyhydroxide to the latter cobalt hydroxide was 50:50 (cobalt atomic ratio), and these two types of the cobalt materials and the lithium carbonate powder were blended in such a mixture ratio that the composition would be $LiCoO_2$ after firing. After dry mixing of these three types of powders, the mixture was fired in the air atmosphere at 950° C. for 12 hours. The fired product was crushed, and the particle size distribution of the obtained $LiCoO_2$ powder formed by agglomeration of primary particles was measured by using a laser scattering type particle size distribution measuring apparatus employing water as a dispersion medium and as a result, the average particle size D50 was 11.5 μm, D10 was 7.6 μm and D90 was 18.5 μm, and a $LiCoO_2$ powder having a specific surface area of 0.37 m$^2$/g as obtained by BET method was obtained.

With respect to the obtained $LiCoO_2$ powder, an X-ray diffraction spectrum was obtained by using an X-ray diffraction apparatus (RINT 2100 manufactured by Rigaku Corporation). In powder X-ray diffraction using CuKα-ray, the half value width of the diffraction peak on (110) plane at 2θ=66.5±1° was 0.096°. The $LiCoO_2$ powder had a press density of 3.11 g/cm$^3$.

By using the above $LiCoO_2$ powder, in the same manner as in Example 1 except that roll press rolling was carried out five times, a positive electrode was produced, batteries were assembled, and the properties were measured. The initial volume capacity density was 513 mAh/cm$^3$ electrode layer, the initial weight capacity density was 161 mAh/g-$LiCoO_2$, and the capacity retention ratio after 30 times of charge and discharge cycles was 97.3%. Further, the heat generation starting temperature of a 4.3 V charged product was 162° C.

EXAMPLE 19

In the same manner as in Example 18 except that the mixture ratio of the former substantially spherical cobalt hydroxide to the latter cobalt oxyhydroxide was 75:25 (cobalt atomic ratio) in Example 18, a $LiCoO_2$ powder was synthesized. The cobalt hydroxide, the cobalt oxyhydroxide and the lithium carbonate were blended in such a mixture ratio that the composition would be $LiCoO_2$ after firing. $LiCoO_2$ had average particle sizes D50 of 13.3 μm, D10 of 8.9 μm and D90 of 18.9 μm, and a $LiCoO_2$ powder having a specific surface area of 0.34 m$^2$/g as obtained by BET method was obtained. With respect to the $LiCoO_2$ powder, an X-ray diffraction spectrum was obtained by using an X-ray diffraction apparatus (RINT 2100 manufactured by Rigaku Corporation). In powder X-ray diffraction using CuKα-ray, the half value width of the diffraction peak on (110) plane at 2θ=66.5±1° was 0.102°. The obtained $LiCoO_2$ powder had a press density of 3.15 g/cm$^3$.

By using this powder, in the same manner as in Example 18, a positive electrode was produced, batteries were assembled, and the properties were measured. The initial weight capacity density was 163 mAh/g-$LiCoO_2$, and the capacity retention ratio after 30 times of charge and discharge cycle was 97.4%. Further, the heat generation starting temperature of a 4.3 V charged product was 164° C.

EXAMPLE 20

In Example 18, the obtained former substantially spherical cobalt hydroxide was fired in the air atmosphere at 800° C. for 12 hours to synthesize substantially spherical tricobalt tetraoxide. The synthesized tricobalt tetraoxide had, in powder X-ray diffraction using CuKα-ray, a half value width of the diffraction peak on (220) plane at 2θ=31±1° of 0.12° and a half value width of the diffraction peak on (311) plane at 2θ=37±1° of 0.13°. As a result of measurement by using a laser scattering type particle size distribution measuring apparatus employing water as a dispersion medium, the average particle size D50 was 15.0 μm, D10 was 12.2 μm and D90 was 19.0 μm, the specific surface area was 3.4 m$^2$/g, the tap density was 2.2 g/cm$^3$, the press density was 2.30 g/cm$^3$, and the powder was a substantially spherical tricobalt tetraoxide powder formed by strong agglomeration of needle primary particles. As a result of observation by a scanning electron microscope with respect to 500 particles, the aspect ratio (proportion of major axis to minor axis) was 1.22:1.

In the same manner as in Example 18 except that the substantially spherical tricobalt tetraoxide powder and the cobalt oxyhydroxide of Example 18 were used, a $LiCoO_2$ powder was synthesized. The mixture ratio of the tricobalt tetraoxide powder to the cobalt oxyhydroxide of Example 18 was 1:1 by the weight ratio. The cobalt oxyhydroxide, the tricobalt tetraoxide and the lithium carbonate were blended in such a mixture ratio that the composition would be $LiCoO_2$ after firing. As a result of measurement by using a laser scattering type particle size distribution measuring apparatus employing water as a dispersion medium, $LiCoO_2$ had average particle sizes D50 of 13.3 μm, D10 of 6.5 μm and D90 of 18.3 μm, and a $LiCoO_2$ powder having a specific surface area of 0.35 m$^2$/g as obtained by BET method was obtained.

With respect to the above powder, an X-ray diffraction spectrum was obtained by using an X-ray diffraction apparatus (RINT 2100 manufactured by Rigaku Corporation). In powder X-ray diffraction using CuKα-ray, the half value width of the diffraction peak on (110) plane at 2θ=66.5±1° was 0.098°. The obtained $LiCoO_2$ powder had a press density of 3.14 g/cm$^3$.

By using this powder, in the same manner as in Example 18, a positive electrode was produced, batteries were assembled, and the properties were measured. The initial weight capacity density was 162 mAh/g-$LiCoO_2$, and the capacity retention ratio after 30 times of charge and discharge cycle was 97.3%. Further, the heat generation starting temperature of a 4.3 V charged product was 164° C.

EXAMPLE 21

In the same manner as in Example 18 except that an aluminum hydroxide powder and a lithium fluoride powder were further added when the substantially spherical cobalt hydroxide, the cobalt oxyhydroxide and the lithium carbonate were mixed in Example 18, a positive electrode active material was synthesized. As a result of elemental analysis, the positive electrode active material was found to be $LiCo_{0.997}Al_{0.003}O_{1.998}F_{0.002}$. The fired product was crushed, and the particle size distribution of the obtained powder formed by agglomeration of primary particles was measured by using a laser scattering type particle size distribution measuring apparatus employing water as a dispersion medium and as a result, the average particle size D50 was 13.2 μm, D10 was 7.3 μm and D90 was 18.3 μm, and the specific surface area was 0.52 m²/g as obtained by BET method.

With respect to the above powder, an X-ray diffraction spectrum was obtained by using an X-ray diffraction apparatus (RINT 2100 manufactured by Rigaku Corporation). In powder X-ray diffraction using CuKα-ray, the half value width of the diffraction peak on (110) plane at 2θ=66.5±1° was 0.125°. The power had a press density of 3.13 g/cm³. As a result of spectral analysis (XPS), aluminum and fluorine were found to be present on the surface.

By using the above powder, in the same manner as in Example 18, a positive electrode was produced, batteries were assembled, and the properties were measured. The initial weight capacity density was 160 mAh/g, and the capacity retention ratio after 30 times of charge and discharge cycle was 99.6%. Further, the heat generation starting temperature of a 4.3 V charged product was 178° C.

EXAMPLE 22

In the same manner as in Example 1 except that the former substantially spherical cobalt hydroxide was not used, and the latter cobalt oxyhydroxide alone was used as a cobalt source in Example 18, $LiCoO_2$ was synthesized. The cobalt oxyhydroxide and the cobalt carbonate were blended in such a mixture ratio that the composition would be $LiCoO_2$ after firing. The obtained $LiCoO_2$ powder had a press density of 3.00 g/cm³.

By using this powder, in the same manner as in Example 18, a positive electrode was produced, batteries were assembled, and the properties were measured. The initial weight capacity density was 160 mAh/g-$LiCoO_2$, and the capacity retention ratio after 30 times of charge and discharge cycle was 97.0%. Further, the heat generation starting temperature of a 4.3 V charged product was 163° C., and the initial volume capacity density was 490 mAh/cm³.

EXAMPLE 23

In the same manner as in Example 18 except that the latter cobalt oxyhydroxide was not used, and the former substantially spherical cobalt hydroxide alone was used as a cobalt source in Example 18, $LiCoO_2$ was synthesized. The cobalt hydroxide and the cobalt carbonate were blended in such a mixture ratio that the composition would be $LiCoO_2$ after firing. The obtained $LiCoO_2$ powder had a press density of 2.95 g/cm³.

By using this powder, in the same manner as in Example 18, a positive electrode was produced, batteries were assembled, and the properties were measured. The initial weight capacity density was 161 mAh/g-$LiCoO_2$, and the capacity retention ratio after 30 times of charge and discharge cycle was 97.5%. Further, the heat generation starting temperature of a 4.3 V charged product was 161° C.

EXAMPLE 24

In the same manner as in Example 20 except that the latter cobalt oxyhydroxide was not used, and the former tricobalt tetraoxide alone was used as a cobalt source in Example 20, $LiCoO_2$ was synthesized. The tricobalt tetraoxide and the cobalt carbonate were blended in such a mixture ratio that the composition would be $LiCoO_2$ after firing. The obtained $LiCoO_2$ powder had a press density of 2.93 g/cm³.

By using this powder, in the same manner as in Example 1, a positive electrode was produced, batteries were assembled, and the properties were measured. The initial weight capacity density was 161 mAh/g-$LiCoO_2$, and the capacity retention ratio after 30 times of charge and discharge cycle was 97.1%. Further, the heat generation starting temperature of a 4.3 V charged product was 160° C.

EXAMPLE 25

In the same manner as in Example 21 except that titanium oxide was used instead of aluminum hydroxide in Example 21, a positive electrode active material was synthesized. As a result of chemical analysis, the positive electrode active material was found to be $LiCo_{0.997}Ti_{0.003}O_{1.998}F_{0.002}$, and the powder had a press density of 3.12 g/cm³. Further, titanium and fluorine were found to be present on the surface. The remaining alkali amount was 0.02 mass %.

By using this powder, in the same manner as in Example 18, a positive electrode was produced, batteries were assembled, and the properties were measured. The initial capacity was 160 mAH/g, the capacity retention ratio after 30 cycles was 99.5%, and the heat generation starting temperature was 177° C.

EXAMPLE 26

In the same manner as in Example 21 except that magnesium hydroxide was used instead of aluminum hydroxide in Example 21, a positive electrode active material was synthesized. As a result of chemical analysis, the positive electrode active material was found to be $LiCo_{0.997}Mg_{0.003}O_{1.998}F_{0.002}$, and the powder had a press density of 3.13 g/cm³. Further, magnesium and fluorine were found to be present on the surface. The remaining alkali amount was 0.02 mass %. By using this powder, in the same manner as in Example 18, a positive electrode was produced, batteries were assembled, and the properties were measured. The initial capacity was 160 mAH/g, the capacity retention ratio after 30 cycles was 99.8%, and the heat generation starting temperature was 187° C.

EXAMPLE 27

In the same manner as in Example 21 except that zirconium oxide was used instead of aluminum hydroxide in Example 21, a positive electrode active material was synthesized. As a result of chemical analysis, the positive electrode active material was found to be $LiCo_{0.997}Zr_{0.003}O_{1.998}F_{0.002}$, and the powder had a press density of 3.12 g/cm³. Further, zirconium and fluorine were found to be present on the surface. The remaining alkali amount was 0.02 mass %. By using this powder, in the same manner as in Example 18, a positive electrode was produced, batteries were assembled, and the properties were measured. The initial capacity was 160 mAH/g, the capacity retention ratio after 30 cycles was 99.3%, and the heat generation starting temperature was 173° C.

INDUSTRIAL APPLICABILITY

According to the present invention, a positive electrode active material for a lithium secondary battery, which has a large volume capacity density, has a high safety, is excellent in uniform coating properties, and is excellent in charge and discharge cyclic durability and low temperature characteristics, a positive electrode for a lithium secondary battery employing it, and a lithium secondary battery, are provided.

The invention claimed is:
1. A process for producing a positive electrode active material, comprising:

firing, as a cobalt source, a mixture of substantially spherical large particle size cobalt hydroxide or tricobalt tetraoxide having such a sharp particle size distribution that the average particle size D50 is from 7 to 20 μm, the average particle size D10 is at least 50% of the average particle size D50 and the average particle size D90 is at most 150% of the average particle size D50, and small particle size cobalt hydroxide or tricobalt tetraoxide having an average particle size D50 of from 10 to 30% of the average particle size D50 of the large particles, in a proportion of from 9:1 to 1:2 as the cobalt atomic ratio, at a temperature of from 700° C. to 1050° C. in an oxygen-comprising atmosphere, to obtain said positive electrode active material which comprises a lithium-cobalt composite oxide represented by the formula $Li_pCo_xM_yO_zF_a$ (wherein M is a transition metal element other than Co or an alkaline earth metal element, $0.9 \leq p \leq 1.1$, $0.980 \leq x \leq 1.000$, $0 \leq y \leq 0.02$, $1.9 \leq z \leq 2.1$, $x+y=1$ and $0 \leq a \leq 0.02$) and comprising a mixture comprising substantially spherical first particles of lithium-cobalt composite oxide having such a sharp particle size distribution that the volume basis cumulative size D10 is at least 50% of the average particle size D50, and the volume basis cumulative size D90 is at most 150% of the average particle size D50, and second particles of lithium-cobalt composite oxide filling the space among the above lithium-cobalt composite oxide particles, in a mass ratio of first particles/second particles of from 1/2 to 9/1.

2. The production process according to claim 1, wherein the large particle size cobalt hydroxide or tricobalt tetraoxide has a press density of from 1.7 to 3.0 g/cm³, and the small particle size cobalt hydroxide or tricobalt tetraoxide has a press density of from 1.7 to 3.0 g/cm³.

3. The production process according to claim 1, wherein each of the large particle size cobalt hydroxide or tricobalt tetraoxide and the small particle size cobalt hydroxide or tricobalt tetraoxide has a specific surface area of from 2 to 20 m²/g.

4. The production process according to claim 1, wherein the large particle size or small particle size cobalt hydroxide has a half value width of the diffraction peak on (001) plane at 2θ=19±1° of from 0.18 to 0.35° and a half value width of the diffraction peak on (101) plane at 2θ=38±1° of from 0.15 to 0.35°, in an X-ray diffraction spectrum using CuKα-ray.

* * * * *